(12) United States Patent
Forman (10) Patent No.: US 9,396,254 B1
(45) Date of Patent: Jul. 19, 2016

(54) GENERATION OF REPRESENTATIVE DOCUMENT COMPONENTS

(75) Inventor: George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1571 days.

(21) Appl. No.: 11/780,776

(22) Filed: Jul. 20, 2007

(51) Int. Cl.
*G06F 17/00* (2006.01)
*G06F 17/30* (2006.01)

(52) U.S. Cl.
CPC ................................. *G06F 17/3071* (2013.01)

(58) Field of Classification Search
CPC .................................................. G06F 17/3071
USPC ......................................................... 715/200
See application file for complete search history.

(56) References Cited

U.S. PATENT DOCUMENTS

| | | | | |
|---|---|---|---|---|
| 5,687,364 | A * | 11/1997 | Saund et al. ........................ | 704/5 |
| 5,857,179 | A * | 1/1999 | Vaithyanathan et al. | |
| 6,411,952 | B1 * | 6/2002 | Bharat ............... | G06F 17/30864 |
| 6,442,545 | B1 * | 8/2002 | Feldman et al. | |
| 6,574,632 | B2 * | 6/2003 | Fox et al. | |
| 6,772,170 | B2 * | 8/2004 | Pennock et al. | |
| 6,820,075 | B2 * | 11/2004 | Shanahan et al. .............. | 715/205 |
| 6,839,680 | B1 | 1/2005 | Liu et al. | |
| 6,886,010 | B2 * | 4/2005 | Kostoff | |
| 7,028,250 | B2 * | 4/2006 | Ukrainczyk et al. .......... | 715/202 |
| 7,181,438 | B1 * | 2/2007 | Szabo | |
| 7,325,005 | B2 * | 1/2008 | Forman et al. | |
| 7,325,006 | B2 * | 1/2008 | Fortnan et al. | |
| 7,415,445 | B2 * | 8/2008 | Forman ........................... | 706/20 |
| 7,647,349 | B2 * | 1/2010 | Hubert et al. .......... | 707/999.107 |
| 2003/0028504 | A1 * | 2/2003 | Burgoon et al. ................... | 707/1 |
| 2003/0101449 | A1 | 5/2003 | Bentolila et al. | |
| 2003/0154181 | A1 * | 8/2003 | Liu et al. ............................ | 707/1 |
| 2003/0174179 | A1 * | 9/2003 | Suermondt et al. ........... | 345/853 |
| 2003/0217335 | A1 * | 11/2003 | Chung et al. ................... | 715/514 |
| 2004/0002973 | A1 * | 1/2004 | Chaudhuri et al. ............... | 707/7 |
| 2004/0220842 | A1 * | 11/2004 | Barney .............................. | 705/7 |
| 2006/0026163 | A1 * | 2/2006 | Forman et al. ................... | 707/10 |
| 2006/0026190 | A1 * | 2/2006 | Fortnan et al. ................ | 707/102 |
| 2006/0101014 | A1 * | 5/2006 | Forman ................. | G06F 17/277 |
| 2006/0161423 | A1 * | 7/2006 | Scott et al. ....................... | 704/10 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002.

(Continued)

*Primary Examiner* — Mustafa Amin
(74) *Attorney, Agent, or Firm* — HP Inc. Patent Department (57) ABSTRACT

Provided are, among other things, systems, methods and techniques for generating a set of representative components from a set of documents, by selecting at least one component for initial inclusion within a representative component set. An additional component is then identified based on (1) frequency of occurrence of the additional component across the set of documents and (2) strength of negative correlation with the representative component set across the set of documents. The representative component set is supplemented with the additional component, and the identification and supplementing steps are repeated multiple times until a specified end condition is satisfied. The representative component set is output and/or the documents are processed based on the representative component set.

19 Claims, 6 Drawing Sheets

(56) References Cited

U.S. PATENT DOCUMENTS

| | | | |
|---|---|---|---|
| 2006/0206443 A1* | 9/2006 | Forman et al. | 706/20 |
| 2007/0118518 A1* | 5/2007 | Wu et al. | 707/5 |
| 2008/0010311 A1* | 1/2008 | Kon et al. | 707/102 |
| 2008/0126176 A1 | 5/2008 | Iguchi | |
| 2008/0154820 A1* | 6/2008 | Kirshenbaum et al. | 706/20 |
| 2009/0012970 A1* | 1/2009 | Ziv et al. | 707/100 |
| 2010/0174670 A1* | 7/2010 | Malik et al. | 706/12 |

OTHER PUBLICATIONS

Baoyao, Zhou; "Intelligent Web Usage Mining" Nanyang Technological University, Division of Information Systems, School of Computer Engineering, 2004.

Baynote Inc.: The Collective Intelligence Platform, Online, http://www.baynote.com/technology/platform/ 2010.

Hottolink Inc.; "Recognize" Online, http://www.hottolink.co.jp/english/reconize.html, 2009.

Andrejko et al.: User Characteristics Acquisition from Logs with Semantics 8. Slovak University of Technology in Bratislava.

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; A Framework for Efficient and Anonymous Web Usage Mining Based on Client-Side Tracking, 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

MOST FREQUENTLY OCCURRING TERMS

GENERATION OF REPRESENTATIVE DOCUMENT COMPONENTS

FIELD OF THE INVENTION

The present invention pertains to document analysis and is applicable, among other things, to systems, methods and techniques for generating one or more lists of representative components from a set of documents, such as a set of representative terms from a set of text-based documents.

BACKGROUND

With the advent of personal computers and the proliferation of other digital electronic devices, the amount of digital data has grown significantly in recent years. It is not at all uncommon to have databases containing hundreds of thousands or even millions of documents. In many business and scientific settings, one needs to generate a list of common themes or topics contained in a corpus of documents. Despite many sophisticated text clustering and taxonomy generation algorithms available today, it continues to be a difficult problem to produce worthwhile results for many types of data.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

In one respect, the present invention is directed to systems, methods and techniques for generating one or more lists (or sets) of representative components based on similar or identical components found within a set of documents. Most of the examples described herein pertain to text-based documents, and therefore the identified components are words, terms, phrases or other textual items that exist within the documents. However, as described in more detail below, the techniques of the present invention can be used to process any of a variety of different kinds of documents and, correspondingly, the identified components are associated with different kinds of elements within these different contexts.

Figure 1:
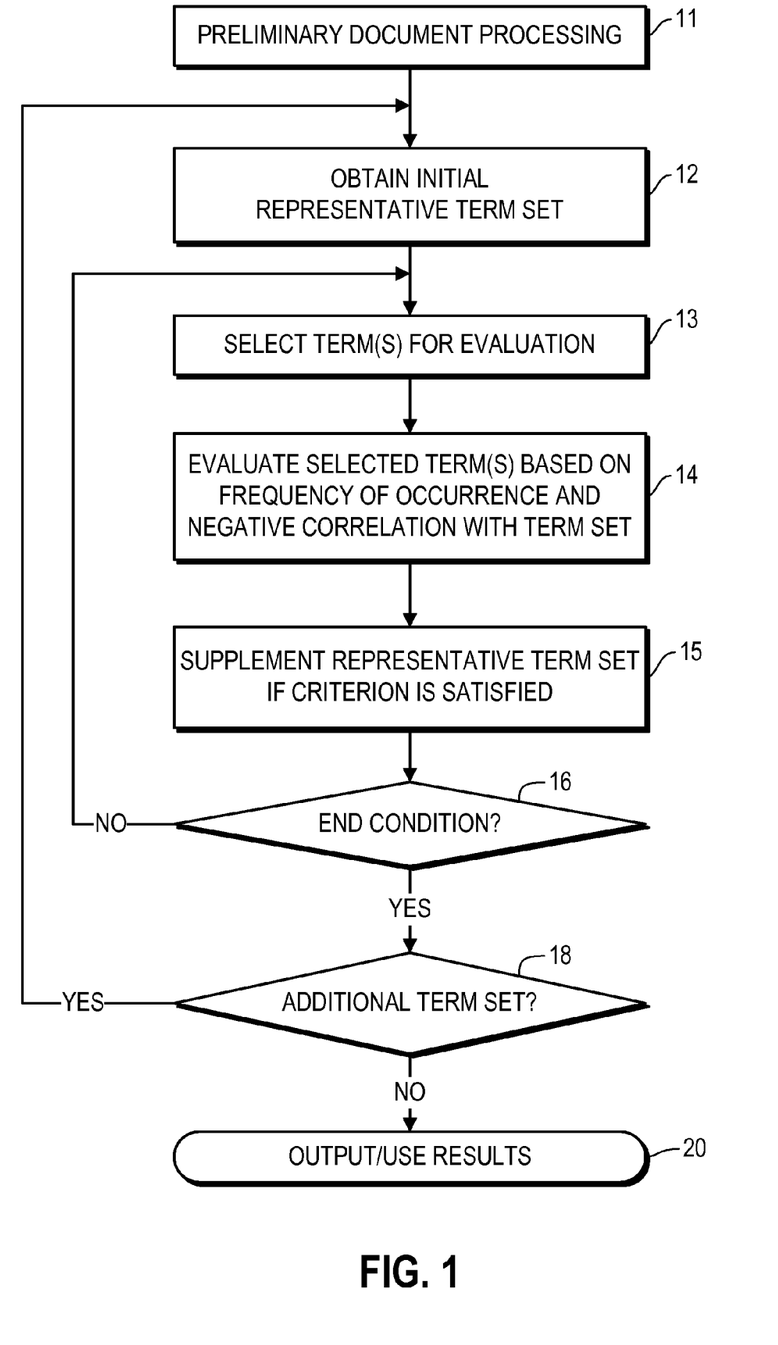
FIG. 1 is a flow diagram illustrating a method for generating one or more term sets from a set of documents.

FIG. 1 illustrates an exemplary method for generating one or more representative term sets from a set of text-based documents. As indicated above, an example involving text-based documents is used throughout this disclosure to facilitate an understanding of the invention. However, it should be understood that the technique of FIG. 1 is more generally applicable and can extend to other kinds of documents, with the word "term" replaced by the word "component" throughout. In the preferred embodiments of the invention, the technique shown in FIG. 1 is an entirely automated process, meaning that it can be implemented using a set of machine-executable steps or in any of the other ways described herein.

Figure 2:
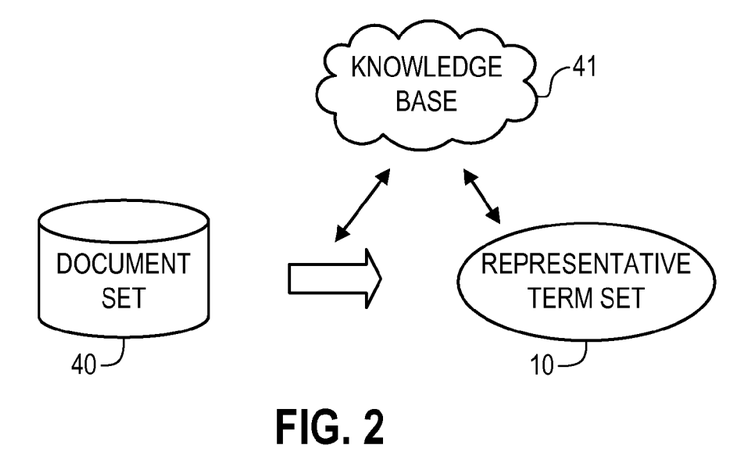
FIG. 2 is a block diagram illustrating a technique for generating a representative term set from a set of documents.

Initially, in step 11 a certain amount of initial document processing is performed. Referring to FIG. 2, the technique of FIG. 1 assumes the existence of a set of documents 40 for which one or more representative component sets (or lists) 10, i.e., term sets (or lists) 10 in this example, are to be generated. This set 40 preferably includes a large number of documents, e.g., 100,000 documents or more. Such documents preferably are of a common type (e.g., all text-based documents) and the types of components to be included in the component term set(s) 10 preferably also are of a common type (e.g., all individual words or, more broadly, all textual items in the present example).

It should be noted that, for purposes of the best processing, a document can be defined arbitrarily. For example, in one embodiment each document is a separate file. In another embodiment (e.g., where at least some of the files are expected to include distinct or separately classifiable portions), a document is defined as a designated section or portion of a particular file (e.g., with individual paragraphs being designated as separate documents). In the case of these latter embodiments, some additional preprocessing preferably is performed to identify the individual "documents" that are to be deemed included within set 40.

In any event, once the appropriate set of documents 40 has been identified, step 11 preferably involves first identifying a list of components (here terms) 42 (shown in FIG. 3) that occur most frequently in the set of documents 40. More preferably, in the present example the terms in list 42 are individual words and the list 42 is limited to the top N (e.g., N=300) most frequently occurring words among the documents in the set 40, potentially subject to certain exceptions. In the present example, such exceptions might include ignoring pronouns, articles and other commonly occurring words that generally do not have independent meaning or limiting the consideration only to nouns or only to nouns and verbs. In order to implement such exceptions, the preprocessing step 11 of such embodiments preferably has access to a corresponding external knowledge base 41 (e.g., one that classifies individual words or terms), as shown in FIG. 2.

Figure 3:
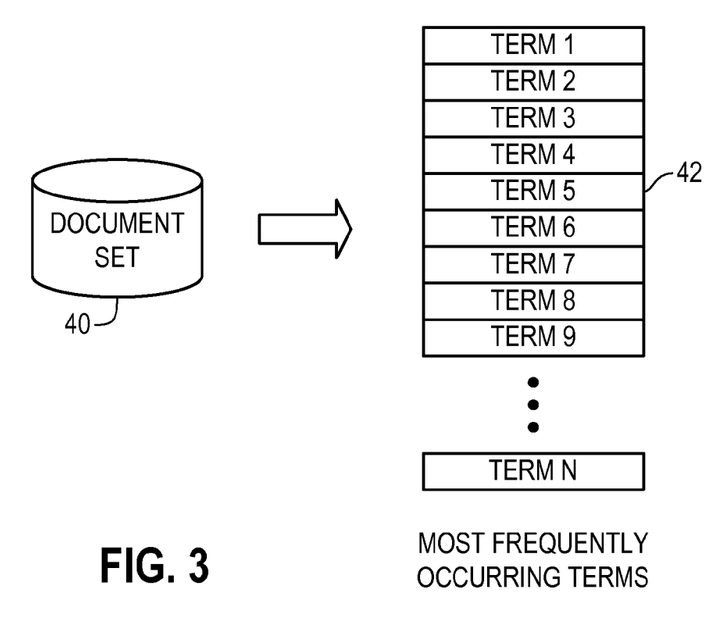
FIG. 3 is a block diagram illustrating a technique for generating a set of most frequently occurring terms within a set of documents.

For purposes of identifying the list 42, it is preferable to count multiple occurrences within a single document (or record) as a single occurrence. Accordingly, the list 42 preferably lists the terms that are found among the greatest number of documents within set 40.

In one alternate embodiment, the terms consist of phrases or other expressions that contain multiple words. Such terms can either be identified in advance and/or can be detected by preprocessing the documents within set 40. In the latter case, a preprocessing step might discover, e.g., that the word "American" often is followed by the word "football" within the set of documents 40. In such an event, a new term "American football" preferably is automatically defined and is thereafter distinguished from the separate terms "American" and "football" (where such words do not occur together). In other embodiments, an existing automated recognizer of noun phrases and/or verb phrases is used to identify useful sequences of words.

In another alternate embodiment, individual terms are expressed using disjunctive combinations of words and/or phrases. For example, an individual term might be defined by a word and one or more of its synonyms. Such synonyms can be identified, e.g., by using a knowledge database 41 that identifies synonyms, such as Wordnet. In this example, a term is deemed to be within a document if any of the synonyms that define it are found within the document. In a similar embodiment, the knowledge database 41 is used to automatically recognize different forms of an individual word (e.g., "run", "running", "ran") and to automatically designate them as a single term (such functionality being available through existing word stemmers, such as the Porter stemmer.

In any event, in the preferred embodiments, the list of commonly occurring terms 42, once identified, preferably is sorted into a list in order from most commonly occurring to least commonly occurring. In the example shown in FIG. 3, term 1 is the most commonly occurring term among the documents in set 40, term 2 occurs somewhat less frequently, term 3 even less frequently, and so on, down to term N, which is the least frequently occurring term within the list 42.

Figure 4:
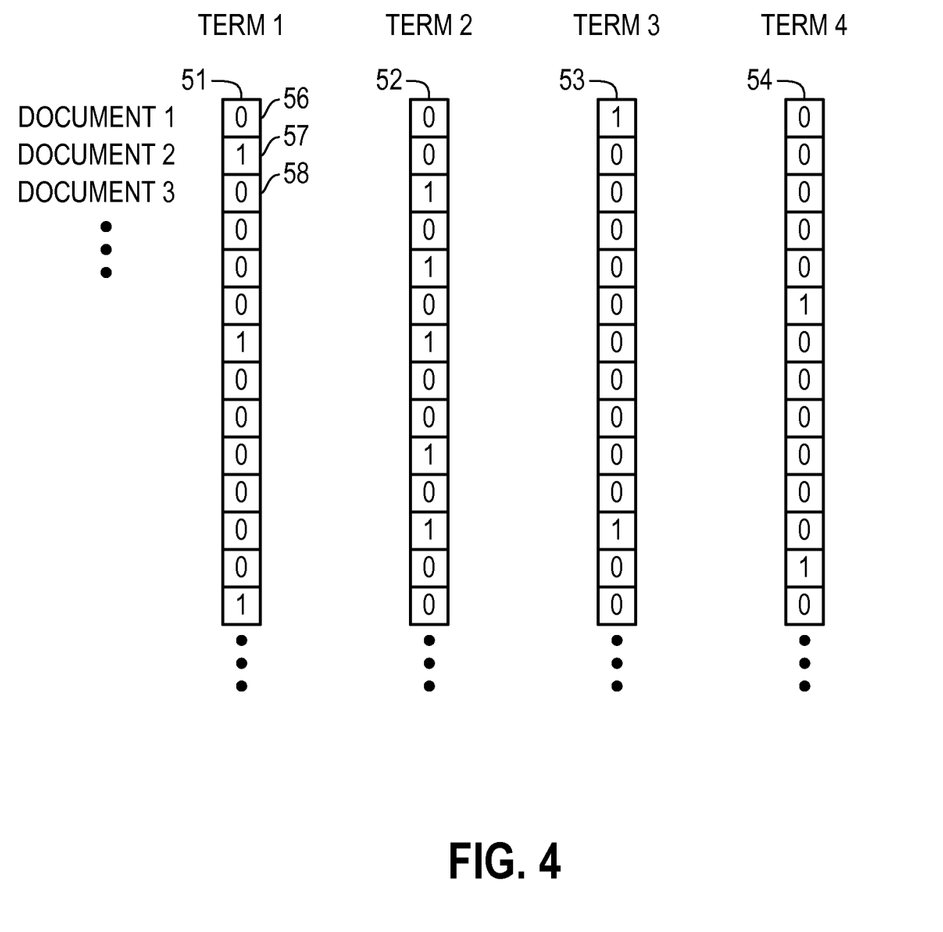
FIG. 4 illustrates a set of bit vectors, each showing, for an individual term, whether the term occurs in each document within a set of documents that is being analyzed.

Another preprocessing substep that preferably is performed in step 11 of the present embodiment is to generate a bit vector for each of terms 1 through N, indicating whether the term appears in each of the D documents within set 40. Thus, FIG. 4 illustrates bit vectors 51-54 for each of terms 1-4, respectively. Referring specifically to bit vector 51, the first bit position 56 indicates that term 1 does not appear in document 1, bit position 57 indicates that term 1 does occur in document 2 and bit position 58 indicates that term 1 does not occur in document 3. Because W is fairly small, the RAM storage for such bit vectors generally will not be an issue; moreover, in certain embodiments a compressed bit-vector representation is used to take advantage of the expected sparsity.

Next, returning to FIG. 1, in step 12 an initial representative term set is obtained. In the preferred embodiments of the invention, this step 12 is performed using the process shown in FIG. 5. Initially, in step 71 the term list 42, containing the most frequently occurring terms sorted based on frequency of occurrence, is obtained.

Figure 6:
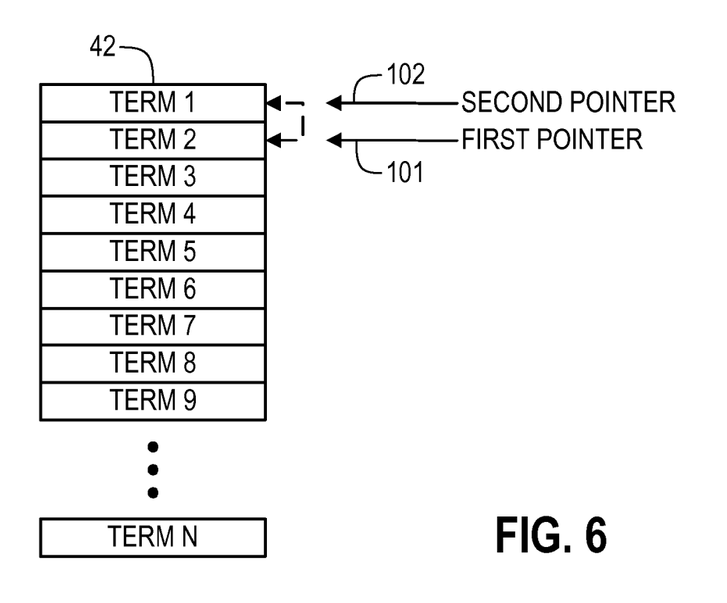
FIG. 6 illustrates initial designations made by first and second pointers when scanning a list of most frequently occurring terms, sorted in order of their frequencies of occurrence, for the purpose of identifying the first two terms to be included within a representative term set.

In step 72 (with reference to FIG. 6), a first pointer 101 is initialized to the second most frequent term in the list 42, i.e., term 2 in the example of FIG. 6. In step 74, again referring to FIG. 6, a second pointer 102 is initialized to the most frequent term in the list 42, i.e., term 1 in the example of FIG. 6.

Figure 5:
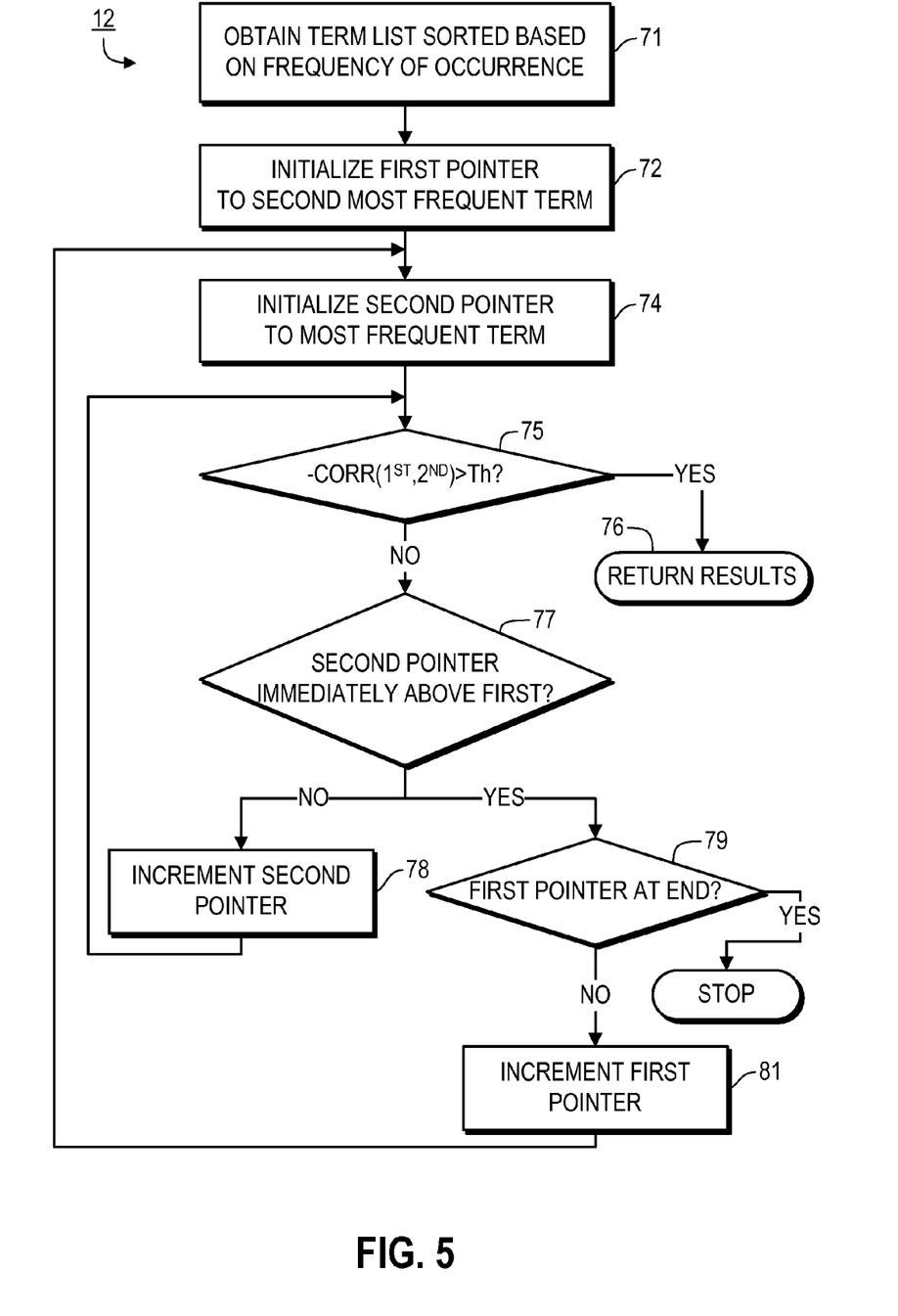
FIG. 5 is a flow diagram illustrating an exemplary process in which an initial representative term set is generated.

In step 75, a measure of negative correlation (or a negative correlation score) is calculated between the terms identified by the first pointer 101 and the second pointer 102 across the documents in set 40, and a determination is made as to whether the strength of the negative correlation exceeds a specified threshold. Generally speaking, as used herein, negative correlation across the set of documents 40 indicates the degree to which the terms and/or sets of terms being evaluated tend not to occur in the same documents or, alternatively stated, tend to cover different documents.

In order to evaluate negative correlation, a negative correlation score preferably is calculated. The preferred embodiments use a measure or score that is based on the Bi-Normal Separation (BNS) measure. More preferably, the following negative correlation score is calculated:

$$s=-bns(i,w.\text{word\_count},v.\text{word\_count},N),$$

where
bns(tp,wc,pos,N)=inverseNormal(tp/pos)−inverseNormal((wc−tp)/(N−pos)), inverseNormal( ) is the inverse cumulative distribution function of the Normal curve (which is readily available in existing statistical tables and calculators), i is a count of the number of documents in set 40 in which both of the evaluated terms are present (which can be calculated as the number of '1' bits in the intersection of the bit vectors for the two terms being evaluated), w.word_count is a count of the number of '1' bits in the bit vector for the term designated by the first pointer 101 (i.e., the number of documents that contain such term), v.word_count is a count of the number of '1' bits in the bit vector for the term designated by the second pointer 102 (i.e., the number of documents that contain such term), and N is the total number of documents in set 40.

It is noted that the foregoing negative correlation score, although preferred, is merely representative. Any other measure, such as the negative of the correlation coefficient resulting from Pearson's correlation between the subject terms across the documents in set 40, instead is used in alternate embodiments of the invention. One feature of evaluating terms based on negative correlation is that terms representing a certain degree of mutual exclusivity tend to be identified.

In the preferred embodiments, a constant predetermined threshold Th is used in step 75, e.g., Th=1.2. In alternate embodiments, Th depends on the number of documents in set 40, expectations regarding the nature of the documents within set 40 (e.g., based on historical experience), and/or any other relevant factors. Such factors can be determined in advance or on-the-fly. In any event, in the present embodiment if s>Th, then processing proceeds to step 76 in which the identified pair of terms is output and processing continues to the next step (i.e., step 13) in FIG. 1. If not, then processing proceeds to step 77.

In step 77, a determination is made as to whether the second pointer 102 is immediately above the first pointer 101 in list 42. If so (as is the case in the example shown in FIG. 6), then processing proceeds to step 79. If not (as is the case in FIG. 7), then processing proceeds to step 78.

In step 78, the second pointer 102 is incremented (to the next most frequently occurring term in list 42) and processing returns to step 75 to evaluate the term newly designated by second pointer 102 with respect to the term designated by first pointer 101. In this manner, each term above the term currently designated by first pointer 101 in sorted list 42 is evaluated with respect to the term designated by first pointer 101, in order from most frequently occurring to least frequently occurring.

In step 79, a determination is made as to whether the first pointer 101 is at the end of the sorted list 42. If so, then processing ceases because a pair of terms to start the representative set 10 cannot be found. On the other hand, if the first pointer 101 is not at the end of the sorted list 42, then processing proceeds to step 81, in which the first pointer 101 is incremented (to the next most frequently occurring term in list 42), and after which processing returns to step 74 to re-initialize the second pointer 102 and repeat the process.

Figure 7:
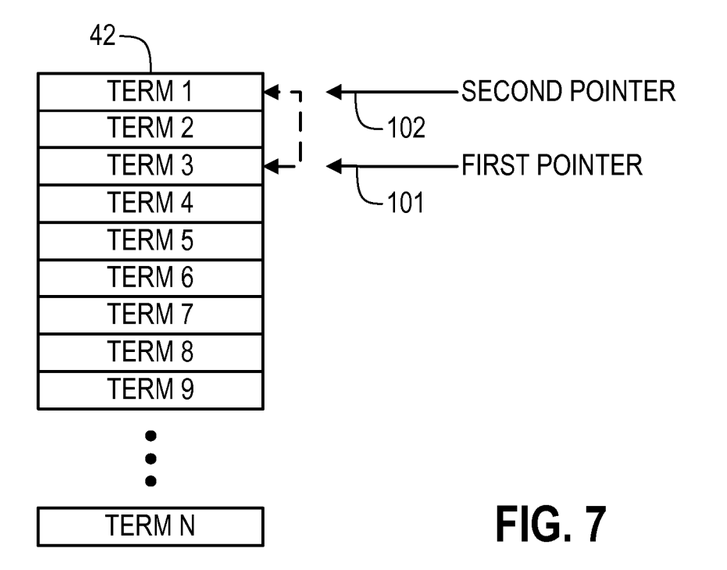
FIG. 7 illustrates subsequent designations of first and second pointers when scanning a list of most frequently occurring terms, sorted in order of their frequencies of occurrence, for the purpose of identifying the first two terms to be included within a representative term set.

In other words, after the second pointer 102 has been incremented to the entry that is immediately above the term designated by the first pointer 101, the first pointer 101 moves one entry down the list 42. Thereafter, the second pointer 102 once again scans all of the entries in order of frequency of occurrence above the term that has been newly designated by the first pointer 101. For example, FIG. 7 illustrates the designations made by the first pointer 101 and second pointer 102 after step 81 has been performed for the first time and, immediately thereafter, step 74 has been repeated for the first time.

The preferred technique for generating the initial representative term set 10 thus involves systematically scanning through the list of most frequently occurring terms 42 in order to find the two most frequently occurring terms having a negative correlation with each other across the documents in set 40 that exceeds a chosen fixed threshold. As a result, the initial terms that are selected for the representative term set 10 (sometimes referred to as the "core terms") occur relatively frequently in the document set 40 (relative to other potential terms). However, any other technique (e.g., one that identifies initial component(s) based on frequency of occurrence and/or strength of negative correlation or one in which the initial component(s) are selected by a user of the system or any other individual) for selecting the initial components instead can be used in alternate embodiments of the invention.

As noted above, after completion of the processing shown in FIG. 5 (in which the initial pair of terms has been selected), processing returns to FIG. 1. More specifically, processing returns to step 13 of FIG. 1.

In step 13, one or more terms is selected for evaluation. In the present embodiment, such selection identifies a single term at each iteration of step 13, in a systematic and sequential manner. More specifically, in the present embodiment certain individual terms within list 42 are sequentially selected with each iteration of step 13 in order of frequency of occurrence within the document set 40, from most frequently occurring to least frequently occurring.

Figure 8:
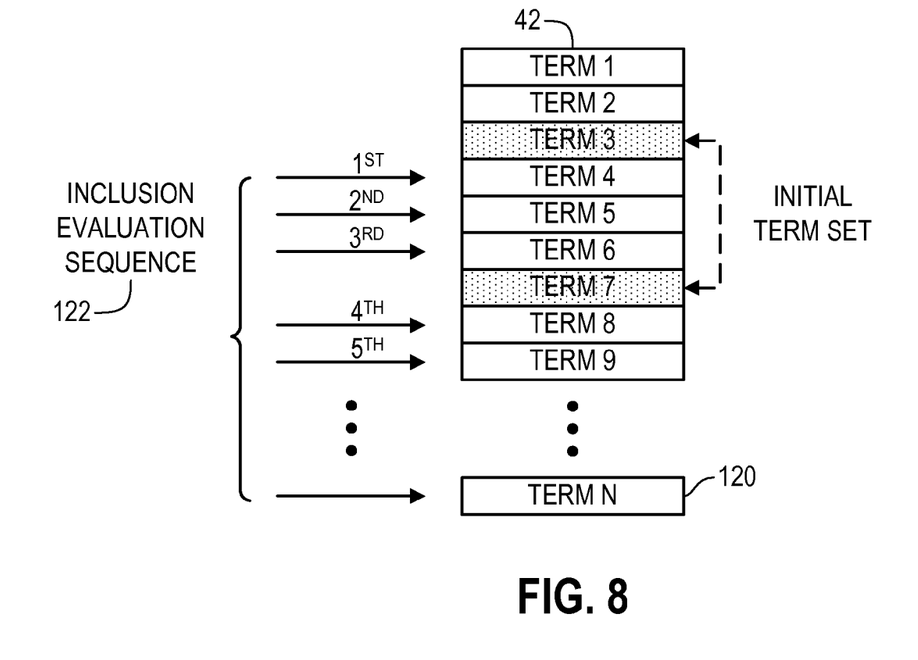
FIG. 8 illustrates a sequence for evaluating terms within a list of most frequently occurring terms, sorted in order of their frequencies of occurrence, for the purpose of identifying one or more additional terms to be included within a representative term set.

For example, FIG. 8 illustrates an ordered list of frequently occurring terms 42, in which term 3 and term 7 were identified in step 12 as the initial terms of representative term set 10. In the present embodiment, the terms above the higher of the two initial terms (i.e., the terms above term 3 in the present example) are not further considered for inclusion, given that they already were found to have insufficient negative correlation with the other term (i.e., term 7 in the present example) that ultimately was selected as one of the initial terms in representative term set 10.

However, all of the other terms in the list 42 of commonly occurring terms (i.e., all of the terms other than the two initial terms and the terms above the higher of the two initial terms) preferably are evaluated for inclusion within representative term set 10. More preferably, such terms are evaluated in order of their frequencies of occurrence across the documents at 40, e.g., according to the illustrated evaluation sequence 122 (most frequent first). Thus, in the present example, on the first iteration of step 13, term 4 is selected, then on the second iteration term 5 is selected, then on the third iteration term 6 is selected, then on the fourth iteration term 8 is selected, then on the fifth iteration term 9 is selected, and so on, until the end 120 of the list 42 (i.e., term N) is reached. In one alternate embodiment, only the terms below the lower of the two initial terms (e.g., starting with term 8 in the present example) are evaluated for inclusion within representative term set 10.

In step 14, the term(s) selected in step 13 is/are evaluated (preferably, each individually if more than one). Preferably, such evaluation is based on the following two factors: (1) frequency of occurrence across the set of documents 40; and (2) strength of negative correlation with the representative term set 10 across the set of documents 40. The preferred technique for evaluating a single selected term in step 14 is now discussed with reference to FIG. 9.

Figure 9:
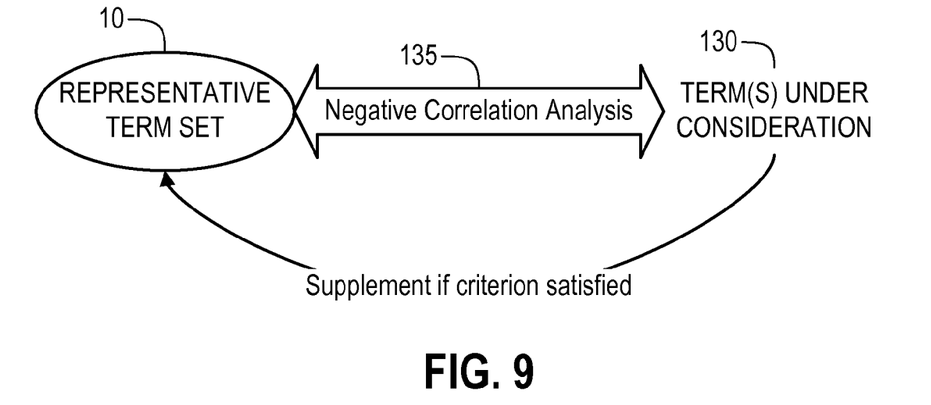
FIG. 9 illustrates a technique for evaluating a particular term under consideration in order to determine whether the representative term set should be supplemented based on such term.

As shown in FIG. 9, in the preferred embodiments, for any given term(s) 130 under consideration, a negative correlation analysis 135 is performed. Moreover, as discussed above, in the preferred embodiments the correlation analysis 135 is performed with respect to only a single term at a time.

Preferably, the negative correlation analysis 135 is similar to the negative correlation analysis performed in step 75. For example, any of the same kinds of negative correlation calculations can be performed (e.g., a BNS-based calculation or Pearson's correlation). Also, in each case the strength of the negative correlation preferably is evaluated with reference to corresponding bit vectors (e.g., bit vectors 51-54).

However, in the preferred embodiments, there also are differences between this negative correlation analysis 135 and that of step 75. For example, in step 75 the correlation calculation preferably is calculated between two individual terms; here, the negative correlation calculation 135 preferably is calculated between the bit vector for the term under consideration 130 and a composite bit vector which preferably is calculated as the union of the bit vectors for all of the terms within representative term set 10 (i.e., a bit vector representing all the documents and indicating which documents contain at least one of the terms in the representative term set 10).

Returning briefly to FIG. 1, in step 15 the representative term set 10 is supplemented with the term evaluated in step 14 if a specified criterion is satisfied. Preferably, this criterion is a threshold that the calculated negative correlation 135 must meet or exceed. However, this threshold preferably is different (e.g., lower) than the threshold used in step 75. For example, if the threshold in step 75 is 1.2, then the threshold used in step 15 is, e.g., 0.6. Moreover, in alternate embodiments of the invention, the threshold used in step 15 is a function of the contents of (e.g., a number of existing terms within) representative term set 10 (e.g., with the threshold declining as the number of terms within representative term set 10 increases).

As indicated above, when a term 130 is added to representative term set 10, a new version of the composite bit vector for the representative term set 10 preferably is calculated; more preferably, the new version is the union of the old version and the bit vector for the newly added term. In addition, in the preferred embodiments, each term that is added to representative term set 10 is removed from further consideration within commonly occurring term list 42, both for the purpose of forming the current representative term set 10 and for forming any subsequent representative term sets 10 (discussed in more detail below) within a single implementation of the overall process of FIG. 1. However, as discussed below, the entire process of FIG. 1 can be repeated with different parameter values; in that case, the list 42 is restored or regenerated, as applicable, each time the process is repeated.

Returning again to FIG. 1, in step 16 a determination is made as to whether an applicable end condition has been reached. In the present embodiment, this end condition is that the final term 120 in the list of commonly occurring terms 42 has been evaluated. If the designated end condition has been reached, then processing proceeds to step 18. If not, then processing returns to step 13 to select the next term(s) for evaluation (e.g., the next term in the evaluation sequence 122).

In step 18, a determination is made as to whether an additional term set 10 is to be generated. At this point, all of the terms that satisfied the criterion for inclusion within the previous representative term set 10 have been selected. Moreover, as noted above, in the preferred embodiments all of such terms have been eliminated from further consideration from within the list of commonly occurring terms 42. Accordingly, the question at this point is whether or not to attempt to generate another representative term set 10 from the terms remaining in list 42.

Depending upon the particular embodiment, the determination in this step 18 is made manually and/or in a fully or partially automated manner. For example, in one embodiment a user is presented with the previously generated representative term set 10 and simply clicks a "generate new set" button (via a provided user interface) if the user would like to have another representative term set 10 attempted to be generated. Of course, and as noted above, it might not be possible to generate a meaningful new set 10, and if such a situation is determined in advance the button preferably is grayed out or simply not presented.

In another embodiment, a decision to generate another representative term set 10 is made automatically if the terms remaining within list 42 satisfy a specified criterion; such criterion might pertain, e.g., to adequate frequency of occurrence among the documents in set 40 and/or to coverage of the set 40 by the remaining terms within list 42 (e.g., as indicated by the union of the bit vectors for all such terms). In a still further embodiment, another representative term set 10 automatically is attempted and then a negative determination potentially is made only after the fact if the resulting set 10 does not meet a specified criterion (e.g., includes a minimum number of terms). In still further embodiments, a combination of one or more of the foregoing options is used to make the determination.

In any event, if an additional representative term set 10 is to be generated, then processing returns to step 12 to obtain the initial set. If not, then processing proceeds to step 20, in which the results are output (e.g., to an end user or to another process) and/or used. Certain examples are described below.

Generally speaking, the techniques of the present invention generate one or more sets of representative terms than by considering frequency of occurrence and strength of negative correlation. Frequency of occurrence tends to indicate a term's importance while, as noted above, strength of negative correlation tends to indicate a certain degree of mutual exclusivity, meaning that the term is likely to be useful for identifying a separate new category. Using a combination of these two factors often will tend to identify both meaningful categories and the best terms to represent those categories.

The preferred techniques select the terms to include within the representative set 10 by emphasizing frequency of occurrence, with the proviso that the strength of the term's negative correlation with the terms in the existing set 10 exceeds a minimum threshold. One benefit of this approach is that representative sets (or lists) 10 tend to be generated along consistent thematic lines. For example, in a set of documents 40 that consists of sports articles, "baseball" might be a commonly occurring term. Although the term "Canada" might be more highly negatively correlated with the term "baseball" than many other terms, the term "hockey" probably occurs more frequently in such sports articles and therefore would be included within the list first (assuming its negative correlation is sufficiently high). Then, by the time the term "Canada" is encountered within list 42, many of the documents that include that term will have already been covered (e.g., by the term "hockey" and other sports names). In this example, the term "Canada" might be selected later when a subsequent list 10 is being generated, e.g., one that is tending to partition the documents by country.

In addition, in embodiments where multiple sets of representative terms 10 are being generated, such multiple sets tend to have different themes. For example, when the present techniques were applied to a set of documents 40 consisting of news articles about sports, two representative term sets 10 were generated: one consisting of geographic names (mainly country names) and another consisting almost entirely of names of different sports. More specifically, the first list was [uk, usa, fiance, south (africa), italy, spain, germany, netherlands, zealand, switzerland, republic, greece, portugal, australian, japan, austria, canada, belgium, zimbabwe, indies, russia, argentina, norway, romania, poland, hungary, turkey, kong, bolivia, malaysia, shield, dubai, bulgaria] and the second list was [soccer, cricket, tennis, rugby, golf, baseball, racing, skiing, athletics, basketball, hockey, cycling, boxing, american, swimming, olympics, rallying, skating, motorcycling, badminton, squash, sports, sport]. Thus, the two representative term sets 10 can be seen as two distinct (essentially "orthogonal") ways of clustering the various documents.

It is noted that the embodiments described above tend to focus on generating representative term sets for text-based documents. However, the techniques described above also can be used for other kinds of documents or records, made up of a variety of different kinds of components or elements. That is, the term "document" and "record" as used herein are intended to be given in their broadest possible meaning, encompassing any identified chunk of data, unless expressly stated otherwise. Similarly, the word "term" as used herein is merely representative and can generally be replaced by the word "component" throughout this disclosure. The word component, in turn, is intended to be given its broadest possible meaning, encompassing any kind of element that makes up a document or record, unless expressly stated otherwise.

Thus, for example, the techniques described above can be applied in an identical manner to generate one or more sets of representative picture or a graphical elements from a set of documents that include different photographs or graphics, e.g., based on a set of image or graphical components that occur frequently throughout such documents, i.e., with the documents in this embodiment being the photographs or graphics and the components being image or graphical components. In still further embodiments, for example, the documents are sound files and the components are audio elements, the documents are financial reports and the components are numbers, the documents are either each consumer's lifetime purchases (e.g., from a particular merchant) or each consumer's purchases on each individual transaction (e.g., individual purchase baskets) and the components are the individual products purchased, or the documents contain any kind of signal and the components are any elemental portion or pattern pertaining to the signal.

The preferred embodiments discussed above generally can be executed very quickly. In one experiment, 28,000 documents were analyzed; the first representative term set 10 was generated from them in just 12.73 seconds; then, the second was generated in 6.17 seconds. One benefit of this speed is that a user can view and even interact with the results in real time. For example, in one representative embodiment the entire process illustrated in FIG. 1 is executed, resulting in multiple sets of representative terms 10, and then the user is provided with the results and given an opportunity to modify the parameters and re-run the process of FIG. 1 in order to generate new sets 10.

In this regard, the user might decide to modify, e.g., any of the negative correlation thresholds, the number of terms in the list of frequently occurring terms 42, various aspects of how the terms are defined (e.g., whether to include synonyms, whether to omit certain terms or certain categories of terms, or whether to designate different knowledge database(s) 41), or the criteria for determining whether a feasible representative term set 10 can be generated. Where such modifications involve simply changing a numeric value, the user interface might, e.g., present a slider that can be dragged to different positions corresponding to different values.

As indicated above, depending upon which parameters are modified, when the entire process of FIG. 1 is to be repeated the list of frequently occurring terms 42 often can be simply restored so that it includes all of the original terms. Alternatively, if the modified parameters have the possibility of changing what terms would be included within list 42, then the entire list 42 preferably is regenerated (e.g., as discussed above) based on the new parameters. In certain embodiments, the user is provided with the opportunity to identify one or more words in the set 10 which is/are to be deleted from the list 42, and then the process of FIG. 1 is re-run.

The results generated by the processes of the present invention can be used (e.g., in step 20) in a variety of different ways. As already noted, a user can simply view the results. That alone often is enough to provide significant information about a set of documents that the user likely would not have had otherwise. Specifically, each generated set of representative terms 10 often can function as a summary of the main topics covered by the document set 40. For example, when applied to a set of incident reports generated by a technical support staff, the present techniques sometimes will provide a list of frequently reported product models as a first set 10 and a list of frequently used terms to describe reported problems as a second set 10.

In addition, the generated representative term set(s) 10 can be used to organize the documents, using a fully or partially automated sorting, classifying or clustering technique. In one embodiment of the invention, each article automatically is assigned to a category corresponding to a term in one of the representative sets 10, with the category being labeled using the term itself. For example, in the example regarding sports articles given above, each article automatically would be assigned to a different sport. If an article contains two of the terms within the same representative set 10, then a disambiguation procedure preferably is implemented, e.g., using heuristics. For example, in one embodiment the article is assigned to the category corresponding to the term which is referenced most frequently within the article. In another, it is assigned using information from an additional knowledge base, e.g., based on known relationships between terms.

The same results can be used to automatically generate an improved set of keywords. In this regard, as noted above, the existence of two terms in a single representative term set 10 implies some degree of mutual exclusivity, meaning that a particular document most likely primarily concerns one or the other, but not both. This knowledge alone is important, as it can be used to automatically trigger a disambiguation procedure to identify the primary topic. For example, in an article about basketball player Michael Jordan playing in a golf match might be primarily about basketball with an incidental reference to golf or might be about a celebrity golf tournament in which there is a brief reference to basketball player Michael Jordan. The present invention's detection of the term "basketball" and "golf" in the same representative term set 10 provides an indication that it is unlikely that the terms have equal weight in the article. Therefore, the technique preferably selects only one of such terms as a keyword, or at least as a primary keyword, potentially listing the other as a secondary keyword.

Still further, the present invention can be capable of automatically detecting separate categories into which documents should be placed or automatically detecting labels to apply to documents, even if there is little or no a priori knowledge regarding the content of the documents in the set 40, and even if the system has no knowledge of the language or some other fundamental characteristics pertaining to the documents. Thus, the present techniques can be used as a data-mining tool, with its results used in a similar manner as those of conventional data-mining tools.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of generating a set of representative components from a set of documents, comprising:
    (a) selecting at least one component for initial inclusion within a representative component set;
    (b) identifying an additional component by individually considering the additional component based on at least a strength of negative correlation with the representative component set across the set of documents, including determining the strength of negative correlation between a bit vector representing the additional component and a composite bit vector representing the at least one component within the representative component set;
    (c) supplementing the representative component set with the additional component, such that the additional component is added to the representative component set where the strength of negative correlation is greater than a threshold;
    (d) repeating steps (b) and (c) a plurality of times until a specified end condition is satisfied; and
    (e) (1) outputting the representative component set and (2) processing the documents based on the representative component set.

2. A method according to claim 1, wherein components in the representative component set are textual.

3. A method according to claim 1, wherein step (a) comprises evaluating components within the set of documents in order from highest frequency of occurrence to lowest frequency of occurrence.

4. A method according to claim 1, wherein step (a) comprises repeatedly calculating negative correlation scores for pairs of components until an initial pair is identified.

5. A method according to claim 4, wherein the pairs of components are evaluated in order from highest frequency of occurrence to lowest frequency of occurrence.

6. A method according to claim 1, wherein step (b) comprises evaluating components within the set of documents in order from highest frequency of occurrence to lowest frequency of occurrence.

7. A method according to claim 1, wherein in step (b) the additional component is identified as a first encountered component having a negative correlation score with the representative component set across the set of documents, where the negative correlation score exceeds a specified threshold.

8. A method according to claim 1, wherein the frequency of occurrence for a given component across the set of documents is determined based on a number of documents in the set of documents that include at least one occurrence of the given component.

9. A method according to claim 1, wherein the strength of the negative correlation with the representative component set is determined based on a Bi-Normal Separation score.

10. A method according to claim 1, further comprising a step, performed upon completion of step (d), of repeating steps (a)-(d) so as to generate a second representative component set.

11. A method according to claim 10, wherein generation of the second representative component set is based on a set of document components that excludes components in the representative component set.

12. A method according to claim 1, wherein step (e) comprises at least one of: (1) clustering the documents based on the representative component set and (2) assigning and outputting keywords for the documents.

13. A method of generating a set of representative components from a set of documents, said method comprising:
   (a) identifying at least two components based on a first criterion pertaining to frequency of occurrence across a set of documents and a second criterion based on negative correlation between components across the set of documents and, in response, creating a representative component set that includes said at least two said components;
   (b) evaluating at least one potential additional component, in order of decreasing frequency of occurrence within the set of documents, by individually considering each potential additional component based on negative correlation with the representative component set across the set of documents, including determining the negative correlation between a bit vector representing the potential additional component and a composite bit vector representing the at least two components within the representative component set;
   (c) supplementing the representative component set with the potential additional component if the negative correlation between the potential additional component and the representative component set exceeds a specified threshold, such that the potential additional component is added to the representative component set where the strength of negative correlation is greater than a threshold;
   (d) repeating steps (b) and (c) a plurality of times until a specified end condition is satisfied; and
   (e) (1) outputting the representative component set and (2) processing the documents based on the representative component set.

14. A method according to claim 13, wherein components in the representative component set are textual.

15. A method according to claim 13, wherein step (a) comprises evaluating components within the set of documents in order from highest frequency of occurrence to lowest frequency of occurrence.

16. A method according to claim 13, wherein the negative correlation with the representative component set is determined based on a Bi-Normal Separation score.

17. A method according to claim 13, further comprising a step, performed upon completion of step (d), of repeating steps (a)-(d) so as to generate a second representative component set.

18. A non-transitory machine-readable medium storing machine-executable process steps for generating a set of representative components from a set of documents, said process steps comprising:
   (a) selecting at least one component for initial inclusion within a representative component set;
   (b) identifying an additional component by individually considering the additional component based on at least a strength of negative correlation with the representative component set across the set of documents, including determining the strength of negative correlation between a bit vector representing the additional component and a composite bit vector representing the at least one component within the representative component set;
   (c) supplementing the representative component set with the additional component, such that the additional component is added to the representative component set where the strength of negative correlation is greater than a threshold;
   (d) repeating steps (b) and (c) a plurality of times until a specified end condition is satisfied; and
   (e) (1) outputting the representative component set and (2) processing the documents based on the representative component set.

19. A non-transitory machine-readable medium according to claim 18, wherein each of steps (a) and (b) comprises evaluating components within the set of documents in order from highest frequency of occurrence to lowest frequency of occurrence.

* * * * *